(12) United States Patent
Dean et al.

(10) Patent No.: US 8,918,840 B2
(45) Date of Patent: Dec. 23, 2014

(54) SYSTEMS AND METHODS FOR IDENTITY-BASED COMMUNICATION GATE FOR SOCIAL NETWORKS

(75) Inventors: Thomas M. Dean, San Juan Capistrano, CA (US); Kenneth J. Cardita, Gilbert, AZ (US)

(73) Assignee: Better Dating Bureau, Inc., Laguna Beach, CA (US)

( * ) Notice: Subject to any disclaimer, the term of this patent is extended or adjusted under 35 U.S.C. 154(b) by 611 days.

(21) Appl. No.: 12/013,375

(22) Filed: Jan. 11, 2008

(65) Prior Publication Data
US 2009/0183226 A1    Jul. 16, 2009

(51) Int. Cl.
*H04L 29/06*   (2006.01)
*G06F 21/62*   (2013.01)

(52) U.S. Cl.
CPC ...... *H04L 63/102* (2013.01); *G06F 2221/2117* (2013.01); *G06F 2221/2101* (2013.01); *G06F 21/62* (2013.01); *G06F 2221/2109* (2013.01); *G06F 2221/2151* (2013.01); *G06F 2221/2149* (2013.01)
USPC .......................................................... 726/3

(58) Field of Classification Search
CPC .................................................. H04L 63/102
USPC ............................................................ 726/3
IPC .................................................... H04L 63/102
See application file for complete search history.

(56) References Cited

U.S. PATENT DOCUMENTS

| | | | |
|---|---|---|---|
| 6,665,389 B1 | 12/2003 | Haste, III | |
| 6,745,367 B1* | 6/2004 | Bates et al. | 715/205 |
| 7,246,067 B2 | 7/2007 | Austin et al. | |
| 8,762,229 B1* | 6/2014 | Hernacki et al. | 705/26.8 |
| 2001/0026609 A1 | 10/2001 | Weinstein et al. | |
| 2001/0047347 A1 | 11/2001 | Perell et al. | |
| 2002/0049806 A1* | 4/2002 | Gatz et al. | 709/203 |
| 2002/0100044 A1* | 7/2002 | Daniels | 725/39 |
| 2002/0116458 A1 | 8/2002 | Bricklin et al. | |
| 2002/0147782 A1* | 10/2002 | Dimitrova et al. | 709/207 |
| 2003/0103627 A1* | 6/2003 | Nierzwick et al. | 380/240 |
| 2003/0115592 A1* | 6/2003 | Johnson | 725/28 |
| 2003/0125033 A1* | 7/2003 | Rindsberg et al. | 455/450 |
| 2003/0171927 A1 | 9/2003 | Bernard | |
| 2003/0172377 A1* | 9/2003 | Johnson | 725/25 |
| 2004/0051733 A1* | 3/2004 | Katzir | 345/741 |
| 2004/0088553 A1* | 5/2004 | Levin et al. | 713/186 |

(Continued)

OTHER PUBLICATIONS

Resnick et al.; PICS: Internet access controls without censorship; Published in: Magazine Communications of the ACM CACM Homepage archive vol. 39 Issue 10, Oct. 1996; pp. 87-93; ACM Digital Library.*

(Continued)

*Primary Examiner* — Bradley Holder
(74) *Attorney, Agent, or Firm* — Knobbe, Martens, Olson & Bear, LLP

(57) ABSTRACT

Systems and methods are disclosed that provide for control of online communication services, including social networks and video games. In some embodiments, parents of children engaging in activities using online communication services can control who their child can engage in communications with, while using online communication services. In some embodiments, parents can monitor potentially problematic communications between their child and other subscribers of an online communication service. Thus, subscribers of online communication services can be prevented from misrepresenting themselves or concealing important information, including age and gender.

13 Claims, 9 Drawing Sheets

(56) References Cited

U.S. PATENT DOCUMENTS

| | | |
|---|---|---|
| 2004/0097287 A1 | 5/2004 | Postrel |
| 2004/0186989 A1* | 9/2004 | Clapper .................... 713/151 |
| 2005/0022234 A1* | 1/2005 | Strothman et al. ............. 725/34 |
| 2005/0081043 A1* | 4/2005 | Evans et al. ................. 713/182 |
| 2005/0198319 A1* | 9/2005 | Chan et al. .................. 709/228 |
| 2005/0266925 A1* | 12/2005 | Hornell et al. ................ 463/42 |
| 2006/0036701 A1* | 2/2006 | Bulfer et al. ................ 709/206 |
| 2006/0130119 A1* | 6/2006 | Candelore et al. ............ 725/135 |
| 2006/0161668 A1* | 7/2006 | Mathew et al. ............... 709/229 |
| 2006/0287080 A1* | 12/2006 | Bychkov ..................... 463/29 |
| 2006/0293057 A1* | 12/2006 | Mazerski et al. ............. 455/445 |
| 2007/0150918 A1* | 6/2007 | Carpenter et al. ............. 725/25 |
| 2007/0297604 A1* | 12/2007 | Carpenter ................... 380/202 |
| 2008/0120183 A1* | 5/2008 | Park ......................... 705/14 |
| 2008/0148310 A1* | 6/2008 | Strickland ................... 725/30 |
| 2009/0037382 A1* | 2/2009 | Ansari et al. ................ 707/3 |
| 2009/0055193 A1* | 2/2009 | Maislos et al. ............... 704/273 |

OTHER PUBLICATIONS

Chung; Development of an integrated chat monitoring and web filtering parental control for child online supervision.; (2004); University of Bath Online Publication; pp. 1-126.*

Forster, Carly and Isabel Teotino, "Driving license ID's help night-clubs create valuable database", Toronto Star: Nov. 21, 2001.

* cited by examiner

Certified Communication Setup

This will allow you to set up and control who your child can communicate with while using our service Settings for: Timmy Brown   Age 12

Contact Limits:
- Minimum Age [9]  — 610
- Maximum Age [15] — 620
- ☑ Male  ☑ Female — 630

Membership Levels to contact — 640
- ☑ Gold Level
- ☑ Silver Level
- ☐ Bronze Level Block Contact During these times — 650
- From: 10:00 pm   To: 8:00 am   ☑ Weekdays  ☐ Saturday  ☑ Sunday
- From: 11:30 pm   To: 8:00 am   ☐ Weekdays  ☑ Saturday  ☑ Sunday
- From: 8:00 am    To: 3:30 pm   ☑ Weekdays  ☑ Saturday  ☑ Sunday Communication Logging — 660
- ☑ Log Communications — 680
- Days to Store Logs [45] — 670

[Save]   [Cancel]

FIG. 6

Parental Monitor

| Communications Sessions for *Timmy Brown* | | | | |
|---|---|---|---|---|
| Time/Date | Length | Who | Status | Actions |
| 8:07 pm 11/4/2007 | 45 min | Sally Jones | :) | 🔊 📄 🗑 ✕ |
| 5:06 pm 12/4/2007 | 15 min | Greg Smith, Sally Jones | :) | 🔊 📄 🗑 ✕ |
| 11:07 pm 12/31/2007 | 105 min | Sally Jones | ⚠ | 🔊 📄 🗑 ✕ |
| 8:34 am 1/4/2008 | 5 min | Jim Jones | :( | 🔊 📄 🗑 ✕ |

— 920, 930, 940, 950

OK — 960

Timmy Brown is OFFLINE

ICON Legend

:) Communication scan shows no problems
⚠ Warning: communication scan shows potential problems
📄 Saved log to hard disk
🔊 Print log
✉ E-mail log
🗑 View log
✕ Delete log

SYSTEMS AND METHODS FOR IDENTITY-BASED COMMUNICATION GATE FOR SOCIAL NETWORKS

CROSS-REFERENCE TO RELATED APPLICATIONS

This application incorporates by reference U.S. application Ser. No. 10/395,324, filed Mar. 20, 2003 and U.S. application Ser. No. 10/330,573 filed Dec. 26, 2002, the entire contents of both of which are incorporated herein by reference and should be considered a part of this specification.

BACKGROUND OF THE INVENTIONS

1. Technical Field

This disclosure relates to the field of online communications. More specifically, this disclosure relates to computer-implemented methods and systems for blocking communications between users of a computer network.

2. Description of the Related Art

Some online social networking and gaming providers ("online providers") offer communication services to their subscribers. Using such a service, a subscriber can request to contact other subscribers and/or engage in other activities, including video gaming, with other subscribers.

A significant problem with offering communications services is that online providers are plagued by the problem of subscribers either misrepresenting themselves or concealing important information, including age and gender. Further, parents of children engaging in activities using these online providers are often unable to control who their child can communicate while using the services of online providers. These issues are especially problematic when parents are unable to monitor potentially problematic communications between their child and other subscribers.

SUMMARY OF THE DISCLOSURE

Systems and methods are disclosed that provide for certified parental control of online communication services, including social networks and video games. In some embodiments, parents of children engaging in activities using online communication services can control who their child can engage in communications with, while using online communication services. In some embodiments, parents can monitor communications between their child and other subscribers of an online communication service. Thus, subscribers of online communication services can be prevented from misrepresenting themselves or concealing important information, including age and gender.

In some embodiments, a system for providing certified parental control of online social networks and video games is provided. The system can include a database including at least one entry associated with a set of control limits for a child, the set of control limits corresponding to categories of persons the child may communicate with. The system can further include a certification server configured to communicate with an online communication server over a network to provide access to the database, the certification server including a server application that (a) registers and certifies a parent, (b) registers and certifies a child, and (c) receives and stores control limits in the database. The certification server can be configured to respond to a parental control request from the online communication server that matches an entry in the database associated with a child by checking whether a subscriber is within the categories of persons the child may communicate with. The online communication server can be configured to filter, enable, prevent, or disable a subscriber communication from the subscriber to the child depending on the response from the certification server.

In some embodiments, a system for providing certified parental control of an interactive application is provided. The system can include a database including at least one entry associated with a set of control limits for a child, the set of control limits corresponding to categories of persons the child may communicate with. The system can further include a certification server configured to communicate with a client over a network to provide access to the database, the certification server including a server application that (a) registers and certifies a parent, (b) registers and certifies a child, and (c) receives and stores control limits in the database. The certification server can be configured to respond to a parental control request from the client that matches an entry in the database associated with a child by checking whether a subscriber is within the categories of persons the child may communicate with. The client can be configured to filter, enable, prevent, or disable a subscriber communication from the subscriber to the child depending on the response from the certification server.

In some embodiments, a system for providing certified parental control of an online communication service is provided. The system can include a database including at least one entry associated with a set of control limits for a second person, the set of control limits corresponding to categories of persons the second person may communicate with. The system can further include a first server configured to communicate with a second server over a network to provide access to the database, the first server including a server application that (a) registers and certifies a first person, (b) registers and certifies a second person, and (c) receives and stores control limits in the database. The first server can be configured to respond to a parental control request from the second server that matches an entry in the database associated with a second person by checking whether a third person is within the categories of persons the second person may communicate with. The second server can be configured to enable, disable, prevent, or filter a third party communication from the third person to the second person depending on the response from the first server.

In some embodiments, a system for providing certified parental control of online communication services is provided. A client can be configured to communicate with a certification server. The client can also be configured to filter, enable or disable a subscriber communication from a subscriber to a child depending on the response from the certification server.

In some embodiments, a computer-implemented method of providing certified parental control for online social networks and video games is provided. The method can include registering and certifying a first person, registering and certifying a second person, and registering and certifying a third person. The method can further include receiving and storing in a database a set of control limits from the first person, the set of control limits associated with categories of persons the second person may communicate with. The method can further include receiving a third party communication over a network from a third person directed to the second person. The method can further include checking whether the third person is within the associated categories of persons the second person may communicate with. The method can further include, in response to the checking, filtering, enabling, or blocking the third party communication from the third person.

In some embodiments, a computer-implemented method of providing certified parental control of an interactive application is provided. The method can include receiving and storing in a database a set of control limits from a first person, the set of control limits associated with categories of persons a second person may communicate with. The method can further include receiving a communication to the second person from a third person. The method can further include in response to receiving the communication, automatically checking in the database whether the third person is not within the categories of persons the second person may communicate with. The checking can inhibit unauthorized communications to the second person from the third person.

In some embodiments, a computer-implemented method of providing certified parental control for online communication services is provided. The method can include receiving and storing in a database a set of control limits from a first person, the set of control limits associated with categories of persons a second person may communicate with. The method can further include receiving a communication to the second person from a third person. The method can further include, in response to receiving the communication, automatically checking in the database whether the third person is within the categories of persons the second person may communicate with. The checking can allow authorized communications to the second person from the third person.

In some embodiments, a computer-implemented method of providing certified parental control for online communication services is provided. The method can include receiving a third party communication over a network from a third person directed at a child. The method can further include checking whether the third person is within associated categories of persons the child may communicate with. The method can further include, in response to the checking, filtering, enabling, or blocking the third party communication from the third person.

Neither this summary nor the following detailed description purports to define or limit the inventions.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

FIG. 6 illustrates an example form page configured to allow a parent to configure communication control limits for a child, and/or enable or disable the logging of online communications.

FIG. 9 illustrates an example form page for allowing a parent to monitor online communications of a child.

DETAILED DESCRIPTION OF THE PREFERRED EMBODIMENT

Figure 1:
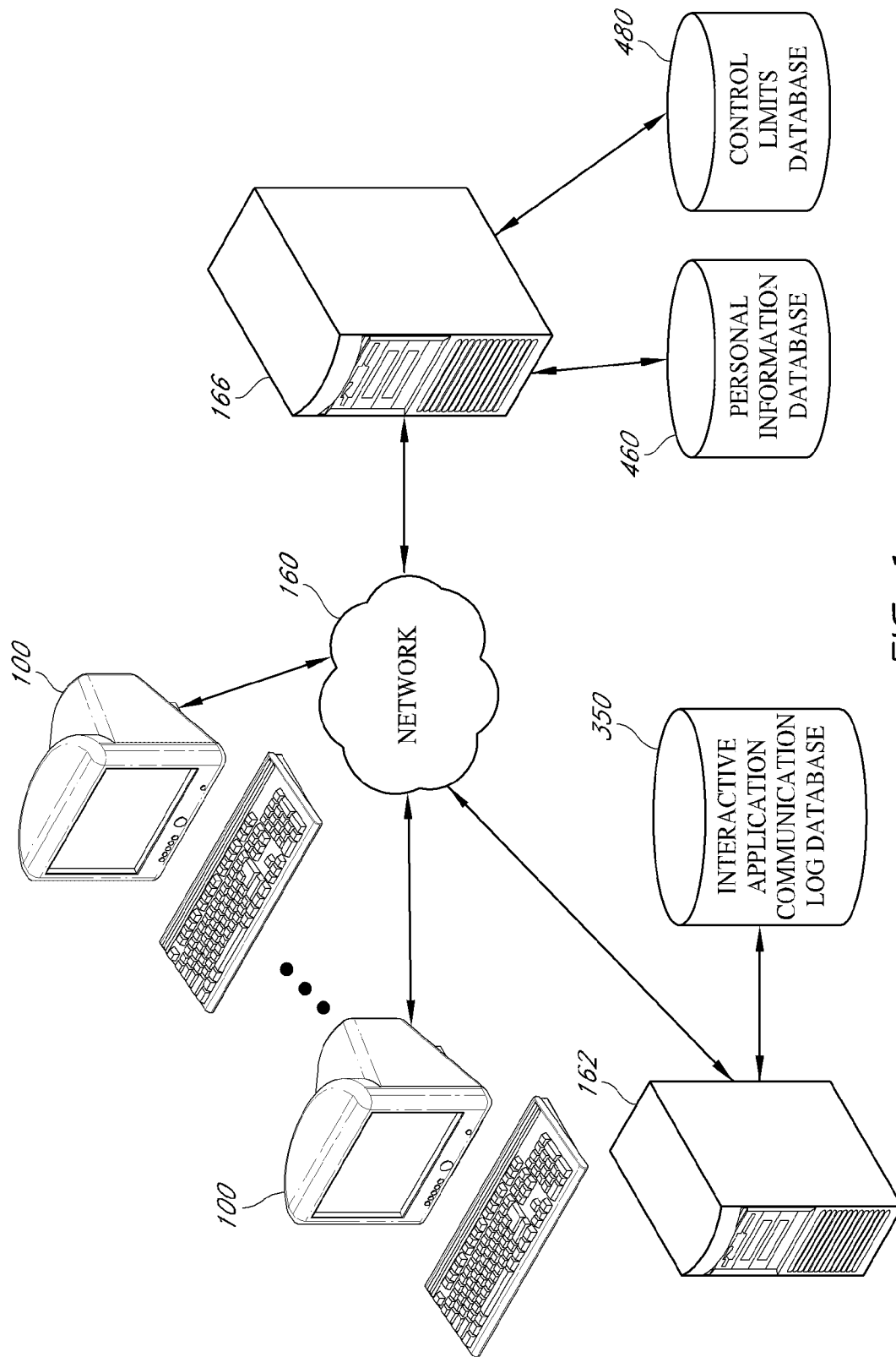
FIG. 1 illustrates a system configured to implement certified parental control for online communications, in accordance with some embodiments of the inventions.

Numerous technical details are set forth in this description. These details are provided to illustrate a embodiments of the inventions, and are not intended to limit the inventions. Thus, nothing in this detailed description is intended to imply that any particular feature, characteristic, or component of the disclosed system is essential to the inventions.

For purposes of illustration, some embodiments are described below in the context of parental controls of childrens' communications over the internet. The inventors contemplate that the systems and methods described herein can be used in other environments, such as, for example, communications between any parties whether over the internet, the World Wide Web, private networks (e.g., for hospitals), a broadcast network (e.g., government agency), an internal network (e.g., corporate enterprise), an intranet, a local area network, a wide area network, and so forth. Additionally, the applications described below through which the parties (whether they are children or adults) communicate can include multi-player games, Massively Multiplayer Games (MMOGs), on-line dating services, social networking sites, etc.

The figures and descriptions set forth below, however, relate to environments where children with each other communicate over the internet. It is also recognized that in other embodiments, the systems and methods can be implemented as a single module and/or implemented in conjunction with a variety of other modules and the like. Moreover, the specific implementations described herein are set forth in order to illustrate, and not to limit, the invention. The scope of the invention is defined by the appended claims.

I. OVERVIEW

Systems and methods are described below that can provide for certified parental control of online communication services, including social networks and video games. In some embodiments, parents of children engaging in activities using online communication services can control who their child can engage in communications with, while using online communication services. In some embodiments, parents can monitor communications between their child and other subscribers of an online communication service. Thus, subscribers of online communication services can be prevented from misrepresenting themselves or concealing important information, including age and gender.

In the following description, reference is made to the accompanying drawings, which form a part hereof, and which show, by way of illustration, specific embodiments or processes in which the invention can be practiced. Where possible, the same reference numbers are used throughout the drawings to refer to the same or like components. In some instances, numerous specific details are set forth in order to provide a thorough understanding of the present disclosure. The present disclosure, however, can be practiced without the specific details or with certain alternative equivalent components and methods to those described herein. In other instances, well-known components and methods have not been described in detail so as not to unnecessarily obscure aspects of the present disclosure.

II. ARCHITECTURE

FIG. 1 illustrates a system that can be configured to implement certified parental control for online communications, in accordance with some embodiments. The term "communication" is meant to define a broad term including its ordinary meaning as well as a broad range of communications including text, voice, video, images, documents, and/or other communications.

In the illustrated embodiment, a plurality of computing systems 100 are in communication with a network 160, and the interactive application server 162 and/or the certification server 166 are also in communication with the network 160. The computing system 100, interactive application server 162, various modules, and/or various components can, in some embodiments, be configured as a client of the certification server 166. Communication over the network can take place using sockets, ports, and/or other mechanisms recognized in the art. As depicted in this drawing, one or more subscribers use a computing system 100 with access to the network 160 to access the interactive application server 162, and/or the certification server 166.

In some embodiments, the interactive application server 162 can comprise a server system (typically comprising multiple physical computers/machines) and associated content that are accessible via the network. The interactive application server 162 can be implemented using physical computer servers that are geographically remote from one another and/or can include content that spans multiple internet domains. As shown in the illustrated embodiment, the interactive application server 162 can be accessible by computing systems 100 via a network 160. In the illustrated embodiment, the interactive application server 162 is in communication with a network 160, the computing system 100, and/or the certification server 166.

In some embodiments, the certification server 166 can comprise a server system (typically comprising multiple physical computers/machines) and associated content that are accessible via the network. The interactive application server 162 can be implemented using physical computer servers that are geographically remote from one another and/or can include content that spans multiple internet domains. As shown in the illustrated embodiment, the certification server 166 can be accessible by computing systems 100 via a network 160. In the illustrated embodiment, the certification server 166 is in communication with a network 160, the computing system 100, and/or interactive application server 162. Generally, the interactive application server 162 and the certification server 166 described herein refer can be integrated with one another and/or sub-divided, despite their physical organization or storage.

The computing system 100 can be used to implement certain systems and methods described herein. For example, in some embodiments, the computing system 100 can be configured to receive a third party communication over a network from a third person directed at a child, check whether the third party is within associated categories of persons the child can communicate with, and respond by enabling or blocking the third party communication. The functionality provided for in the components and modules of the computing system 100 can be combined into fewer components and modules or further separated into additional components and modules.

The computing system 100 can include, for example, a personal computer that is IBM, Macintosh, or Linux/Unix compatible. In some embodiments, the computing device can comprise a server, a laptop computer, a cell phone, a personal digital assistant, a kiosk, or an audio player, for example. Additionally, the exemplary computing system can include a central processing unit ("CPU"), which can include a conventional microprocessor. The computing system 100 can further include a memory, such as random access memory ("RAM") for temporary storage of information and a read only memory ("ROM") for permanent storage of information, and a mass storage device, such as a hard drive, diskette, or optical media storage device. Typically, the modules of the computing system 100 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 100 can generally be controlled and coordinated by operating system software, such as Windows 95, Windows 98, Windows NT, Windows 2000, Windows XP, Windows Vista, Linux, SunOS, Solaris, or other compatible operating systems. In Macintosh systems, the operating system can be any available operating system, such as MAC OS X. In other embodiments, the computing system 100 can be controlled by a proprietary operating system. Conventional operating systems control and schedule computer processes for execution, perform memory management, provide file system, networking, and I/O services, and provide a user interface, such as a graphical user interface ("GUI"), among other things.

The exemplary computing system 100 includes one or more commonly available input/output (I/O) devices and interfaces, such as a keyboard, mouse, touchpad, and printer. In some embodiments, the I/O devices and interfaces include one or more display device, such as a monitor, that allows the visual presentation of data to a user. More particularly, a display device provides for the presentation of GUIs, application software data, and multimedia presentations, for example. The computing system 100 can also include one or more multimedia devices, such as speakers, video cards, graphics accelerators, and microphones, for example.

In the embodiment of FIG. 1, the I/O devices and interfaces provide a communication interface to various external devices. In the embodiment of FIG. 1, the computing system 100 is coupled to a network 160, such as a LAN, WAN, or the Internet, for example, via a wired, wireless, or combination of wired and wireless, communication links. The network 160 communicates with various computing devices and/or other electronic devices via wired or wireless communication links.

In the exemplary embodiment of FIG. 1, the network 160 is coupled to an interactive application server 162, such as a social network server, video gaming sever, and/or other online communication service server. The interactive application server 162 can be coupled to an interactive communication log database 350. The network 160 is also connected to a certification server 166. The certification server 166 can be connected to a personal information database 460, which can include a private or government public information database, and a control limits database 480.

The interactive application server 162 can be configured to allow subscribers to engage in various communications with one another, contact one another, and/or engage in other interactive activities. The information supplied by the certification server 166 can include the personal information of subscribers of the interactive application server 162. This personal information can include a subscriber's name, social security number, passport number, driver's license number, various government issued identification, address, date of birth, gender, telephone number, photograph, mother's maiden name, and/or other information. In some embodiments, the certification server 166 can be configured to communicate with the interactive application server 162 over the network 160 to enable or disable subscriber communications between subscribers using computing systems 100 based on personal information.

In addition to the devices that are illustrated in FIG. 1, the network 160 can communicate with other data sources, databases, and/or other computing devices. In addition, the data sources can include one or more internal and/or external data sources. In some embodiments, one or more of the data sources and/or databases can be implemented using a relational database, such as Sybase, Oracle, CodeBase and Microsoft® SQL Server as well as other types of databases such as, for example, a flat file database, an entity-relationship database, and object-oriented database, and/or a record-based database.

Figure 2:
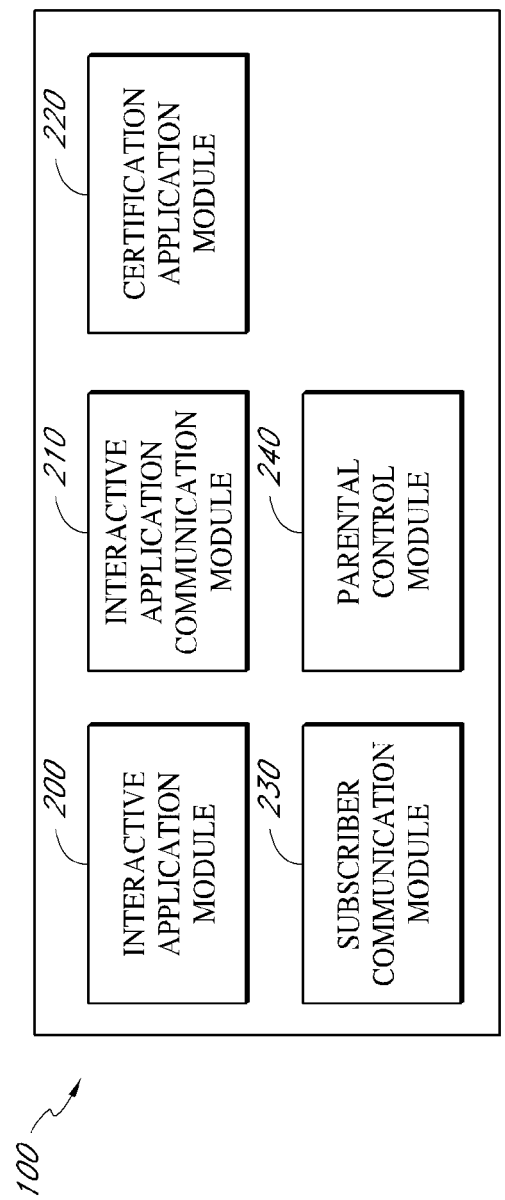
FIG. 2 illustrates a system configured to implement certified parental control for online communications, and illustrates exemplary user components for accessing the system.

FIG. 2 illustrates a system that implements certified parental control for online communications, and illustrates typical user components for accessing the system, in accordance with some embodiments. In the embodiment of FIG. 2, the computing system 100 includes an interactive application module 200 that can be executed by the CPU.

In some embodiments, the interactive application module 200 can be a video game, such as an online multi-player gaming application, including Club Penguin®, World of Warcraft®, Second Life®, or other games. In some embodiments, the interactive application module 200 can be a commercially available email application, such as Mozilla Thunderbird and/or Microsoft Outlook. In some embodiments, the interactive application module 200 can be a web browser application, such as Mozilla Firefox, Apple Safari, and/or Microsoft Internet Explorer, which implement the basic World Wide Web standards such as HTTP and HTML.

In various embodiments the interactive application module 200 can deliver various media to the subscriber such as email services including Gmail, Yahoo Mail, and Hotmail. In various embodiments the interactive application module 200 can deliver various media to the subscriber including video, such as YouTube, and/or images, such as Snapfish and/or Flickr. In some embodiments, the interactive application module 200 can be a social networking web site, such as Friendster, Facebook, Match.com, JDate.com, and/or MySpace.

In some embodiments, the interactive application module 200 can be a collaborative real-time editor, such as ACE, CoWord, and/or EditGrid that allows several people to edit a computer file, such as a spreadsheet and/or text document, using different computers at the same time. In some embodiments, the interactive application module 200 can be a chat client such as AOL Instant Messenger and/or Google Talk. The interactive application module 200 can include, by way of example, components, such as software components, object-oriented software components, class components and/or task components, processes, functions, attributes, procedures, subroutines, segments of program code, drivers, firmware, microcode, circuitry, data, databases, data structures, tables, arrays, and/or variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or can be written in an interpreted programming language such as, for example, BASIC, Perl, or Python. It will be appreciated that software modules can be callable from other modules or from themselves, and/or can be invoked in response to detected events or interrupts. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules described herein are preferably implemented as software modules, but can be represented in hardware or firmware. Generally, the modules described herein refer to logical modules that can be combined with other modules or divided into sub-modules despite their physical organization or storage.

In the embodiments described herein, the computing system 100 is configured to execute the interactive application communication module 210, among others, in order to enable communication between the interactive application module 200 and the interactive application server 162. For example, in some embodiments, the interactive application module 200 can be a video game. When the interactive application module 200 needs to receive information, such as the next level of a video game from the interactive application server 162, the interactive application communication module 210 can use the network 160 to access the interactive application server 162 to receive such information. Alternatively, when the interactive application module 200 needs to send information, such as player progress on the current level of a video game to the interactive application server 162, the interactive application communication module 210 can use the network 160 to access the interactive application server 162 to send such information.

In some embodiments, the computing system 100 can be configured to execute the certification application module 220, among others, in order to register and/or certify a subscriber of the interactive application server 162. The certification application module 220 can be configured to allow a subscriber of the interactive application server 162 to provide personal information to register with the certification server 166. In an exemplary embodiment, the subscriber can be a parent and/or a child. In some embodiments, the subscriber can be certified when the personal information, such as age and/or gender can be verified to ensure its accuracy by the certification server 166.

As described above, the personal information can include a subscriber's name, social security number, driver's license number, passport number, various government identification, address, date of birth, gender, telephone number, photograph, mother's maiden name, other photographs, videos, and/or other identity verification information. In some embodiments, the personal information provided to the interactive application server 162 by the certification application module 220 can be an identifier, such as a pin number and/or confirmation number associated with the subscriber. The identifier can be unique to a subscriber and/or associated with multiple subscribers.

In some embodiments, the identifier can be associated with an age group, gender, and/or other groups. In some embodiments, the identifier can be obtained when the subscriber confirms his identity with a notary, a certification center, and/or a certification server 166 by presenting a document such as a passport, birth certificate, social security card, driver's license, and/or other documents. In an exemplary embodiment, a parent and/or a child can confirm his identity with the certification server 166 using personal information.

In some embodiments, using the techniques described above, the certification application module 220 can be configured to verify that subscribers are certified. In an exemplary embodiment, the interactive application module 200 is configured to access the subscriber communication module 230 when a subscriber attempts to communicate with another subscriber, such as a child, of the interactive application server 162. The subscriber communication module 230 can then access the interactive application server 162, which in turn can access the certification server 166 to check whether the subscriber is within a set of associated categories of persons the child can communicate with. When the certification server 166 responds to the interactive application server 162, communications between the child and the subscriber can be enabled, filtered, and/or disabled by the interactive application server 162.

In some embodiments, filtering can include reducing, altering, and/or changing the content of communications between the subscriber and child. In other embodiments, a response can be sent back to the computing system 100 of the child and/or subscriber over the network 160 from the interactive application server 162, such that the computing system 100 enables or disables communications between the child and subscriber.

As illustrated in FIG. 2, the computing system can also include a parental control module 240. The parental control module 240 can be configured to allow a parent to set up and/or control who their child can communicate with while using the interactive application module 200. In various embodiments, the parental control module 240 can store control limits on the computing system 100 and/or can use the network 160 to access the interactive application server 162 and/or the certification server 166 to store control limits. In some embodiments, a parent can enter in various control limits on subscribers of the interactive application server 162 that their child can participate and/or engage in communications with. These control limits can include a minimum age, maximum age, gender, names, and/or other restrictions on subscribers that their child can communicate with. Additionally, in some embodiments, a parent can enter a limit that their child can only communicate with specific other people identified by a unique PIN, certification, password, or the like.

In some embodiments, the control limits can include limits on the level of subscriber memberships that their child can contact. It can be desirable to have three levels of subscribers—bronze, silver, and gold—with bronze being a subscriber who has confirmed the least amount of certification information such as identity, date of birth, gender, height and/or weight, a current photograph(s), and/or marital status. A silver subscriber can additionally require home ownership confirmation, income verification, and/or a credit report. A gold membership can additionally require the silver and gold information and, in addition, driving and criminal records, substance abuse testing, professional license association information, and/or other information. It should be noted that the level of subscribers are provided as an exemplary embodiment, and there can be as few as two or more than three.

Additionally, parental control limits can include dates and/or times when a child can engage in communications while using the interactive application module 200. In exemplary embodiments, when the subscriber, date, and/or time does not satisfy the parental control limits in place, communications using the interactive application module 200 are not permitted. Alternatively, if the control limits are satisfied, communications using the interactive application module 200 are permitted.

In some embodiments, the parental control module 240 can be configured to allow a parent to log communications made by their child while using the interactive application module 200. In some embodiments, the logged communications can be stored on the computing system 100, the interactive application server 162, and/or the certification server 166. Advantageously, the parental control module 240 can notify the parent of potential problems in the logged communications. In some embodiments, the parental control monitor 240 can search the logged communications, such as text, voice, video, images, documents, and/or other communications for profanity, sexual, and/or other content. This searching can be advantageous in determining whether a communication is suspicious and/or problematic. The parental control module 240 can also track the time and/or date of communications made while using the interactive application module 200, the length of communications, the identity of the subscriber that was communicated with, and can be configured to allow the printing, saving, emailing, viewing, and deletion of the communications.

The computing system 100 can also comprise a subscriber communication module 230. In some embodiments, the computing system 100 is configured to execute the subscriber communication module 230 when a subscriber wishes to communicate with another subscriber while using the interactive application module 200. For example, in some embodiments, the interactive application module 200 can be an online social network. When a subscriber, such as child, is contacted by another subscriber, and/or a child contacts another subscriber, the subscriber communication module 230 can be executed by the interactive application module 200.

The subscriber communication module 230 can then communicate over the network 160 with the interactive application server 162 and/or the certification server 166. In an exemplary embodiment, the certification server 166 is contacted and responds as to whether the subscriber satisfies the control limits configured by the parent. The subscriber communication module 230 can then inhibit, block, and/or enable communication between the subscriber and the child when they are using the interactive application module 200. In some embodiments, the subscriber communication module 230 can be configured to allow a level of communication between the child and subscriber that is in between completely enabling or disabling all communication. In an embodiment, the subscriber communication module 230 can selectively permit certain communications between the child and subscriber.

Figure 3:
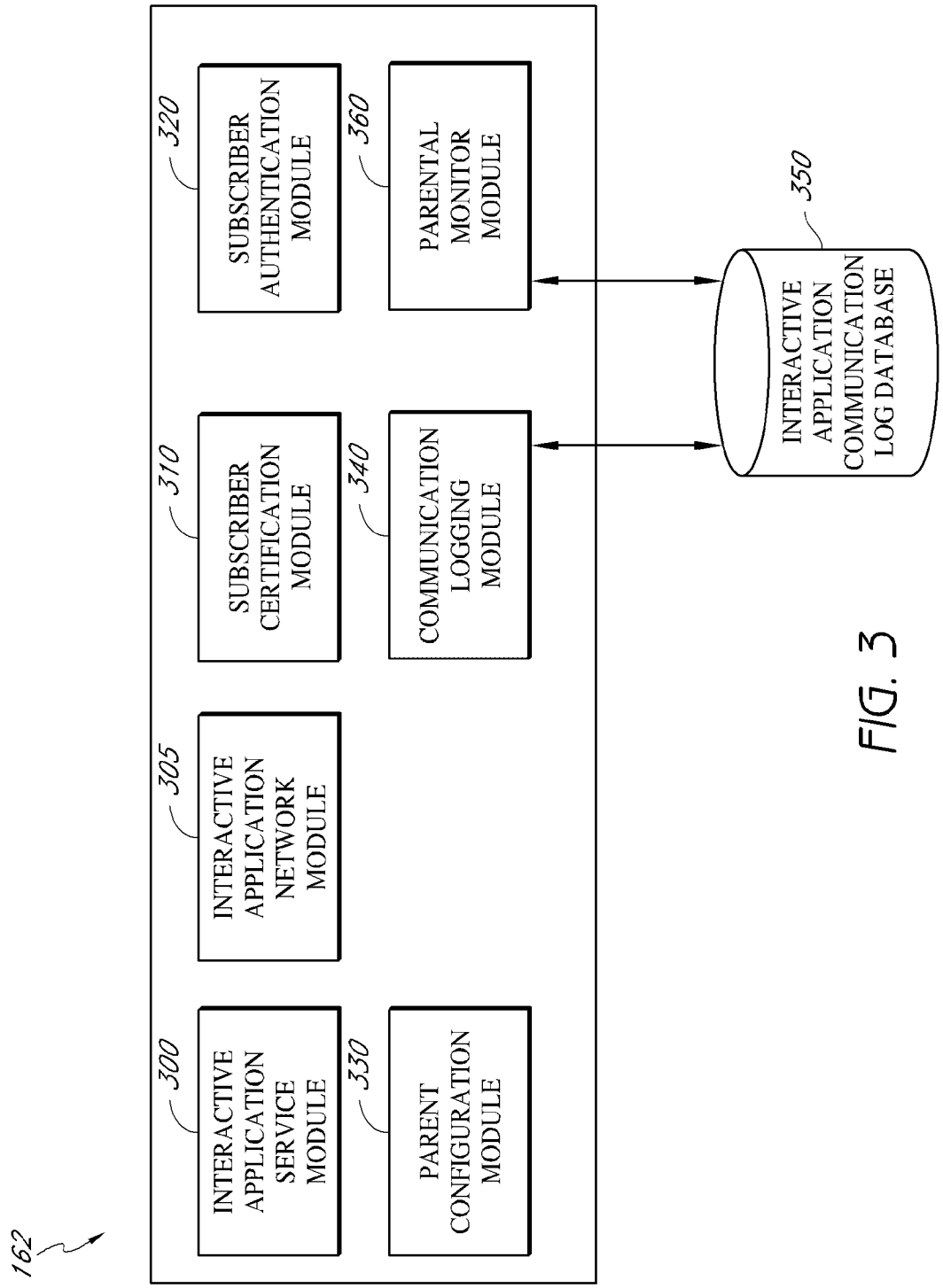
FIG. 3 illustrates a system configured to implement certified parental control for online communications, and illustrates exemplary interactive application server components.

FIG. 3 illustrates a system that implements certified parental control for online communications, and illustrates typical interactive application server components, in accordance with some embodiments of the inventions. In the embodiments of FIG. 3, the interactive application server 162 includes an interactive application service module 300. In some embodiments, the interactive application service module 300, among others, can be configured to communicate with the interactive application module 200 on a computing system 100.

For example, in some embodiments, the interactive application module 200 can be a video game. When the interactive application module 200 needs to receive information, such as the next level of a video game from the interactive application server 162, the interactive application communication module 210 can use the network 160 to access the interactive application server 162 to receive such information. When the interactive application server 162 is contacted, the interactive application service module 300 can be executed. The interactive application service module 300 can then send back to the interactive application communication module 210 the next level of the video game. The interactive application communication module 210 can then update the interactive application module 200 with the next level of the video game.

Alternatively, when the interactive application module 200 may need to send information, such as player progress on the current level of a video game to the interactive application server 162, the interactive application communication module 210 can use the network 160 to access the interactive application server 162 to send such information. When the interactive application server 162 is contacted, the interactive application service module 300 can then be executed and receive the updated information from the interactive application communication module 210.

As further illustrated in FIG. 3, the interactive application server 162 can include an interactive application network module 305. The interactive application network module 305 can be configured to enable communication between various subscribers of the interactive application sever 162 while using the interactive application module 200. In an exemplary embodiment, when a child uses the interactive application module 200 to communicate with another subscriber using the interactive application module 200, the interactive application server 162 is contacted, and the interactive application network module 305 is executed. The interactive application network module 305 can execute the subscriber authentication module 320, among others, to ensure that the parental control limits are satisfied. In some embodiments, the subscriber authentication module 320 can execute the interactive application network module 305.

The interactive application network module 305 can use various mechanisms to enable communication between subscribers. In some embodiments, the interactive application network module 305, among others, can use sockets, ports, and/or other mechanisms recognized in the art to enable communication among subscribers. The interactive application network module 305 can directly forward communications between subscribers to one another and/or perform processing on the communications using the various modules described herein.

The interactive application server 162 can also include a subscriber certification module 310. In some embodiments, the interactive application server 162 is configured to execute the subscriber certification module 310, among others, in response to a request over the network 160 from the certification application module 220 of a computing system 100 to register and/or certify a subscriber of the interactive application server 162. The subscriber certification module 310 can serve as an interface between a subscriber's computing system 100 and the certification server 166.

The interactive application server 162 can also include a subscriber authentication module 320. In some embodiments, the interactive application server 162 is configured to execute the subscriber authentication module 320, among others, in response to a request, such as a parental control request, over the network 160 from the subscriber communication module 230 of a computing system 100 to authenticate, validate, and/or verify that a subscriber of the interactive application server 162 is within a set of associated categories that another subscriber, such as a child, can communicate with. In an exemplary embodiment, the subscriber authentication module 320 is configured to access the certification server 166. When the certification server 166 responds to the subscriber authentication module 320, communications between the child and subscriber can be enabled, blocked, and/or inhibited. The subscriber certification module 310 can serve as an interface between a subscriber's computing system 100 and the certification server 166.

In some embodiments, the subscriber authentication module 320 can validate and/or verify that a subscriber is within a set of associated categories that another subscriber, such as a child can communicate with, without using the certification server 166. In some embodiments, the subscriber certification module 310 can use a cache, such as a database, to store the personal information of subscribers. This can be advantageous in avoiding communication with the certification server 166 to check whether a subscriber is certified. The cache can store personal information for subscribers that were recently certified by the certification server 166.

In the illustrated embodiments, the interactive application server 162 also includes a parent configuration module 330. In some embodiments, the parent configuration module 330 can be configured to communicate with the parental control module 240 on a computing system 100 and/or forward communications from the parental control module 240 to the certification server 166. In some embodiments, the forwarded communications can be control limits set by a parent for their child to limit the subscribers of the interactive application server 162 that their children can communicate with while using the interactive application module 200. Alternatively, the parent configuration module 300 can be configured similar to the parental control module 160 of the computing system 100.

As further depicted in FIG. 3, the interactive application server 162 includes a communication logging module 340. The communication logging module 340 can be configured to log communications between subscribers of the interactive application server 162 for later review by accessing an interactive application communication log database 350. In some embodiments, the communication logging module 340 can record some or all communications between subscribers by accessing the interactive application network module 305, which can permit subscribers of the interactive application server 162 to communicate with one another. In an exemplary embodiment, a parent of a child can use the parental control module 240 to enable or disable the logging of communications made by their child, while using the interactive application module 200.

As illustrated in FIG. 3, the interactive application server 162 can access the interactive application communication log database 350, which can be used to store the logged communications. In some embodiments, the interactive application communication log database 350 can track the time and/or date, subscribers involved in the communications, the length of the communications, and whether the communications are problematic. Communications can be determined to be problematic or suspicious by using filtering software known in the art. Alternatively, the logged communications can be stored on the computing system 100 and/or the certification server 166.

The interactive application server 162 can advantageously include a parental monitor module 360. In some embodiments, the parental monitor module 360 can be configured to access the interactive application communication log database 350. In an exemplary embodiment, a parent of a child can use the parental control module 240 to communicate with the parental monitor module 360. The parental monitor module 360 can access the interactive communication log database 350 of the interactive application server 162 and send back the logged communications of a child to the parental control module 240 of the computing system 100. In some embodiments, the parental monitor module 360 can search the logged communications and alert the parent by reporting suspicious and/or potentially problematic communications to the parental control module 240.

Figure 4:
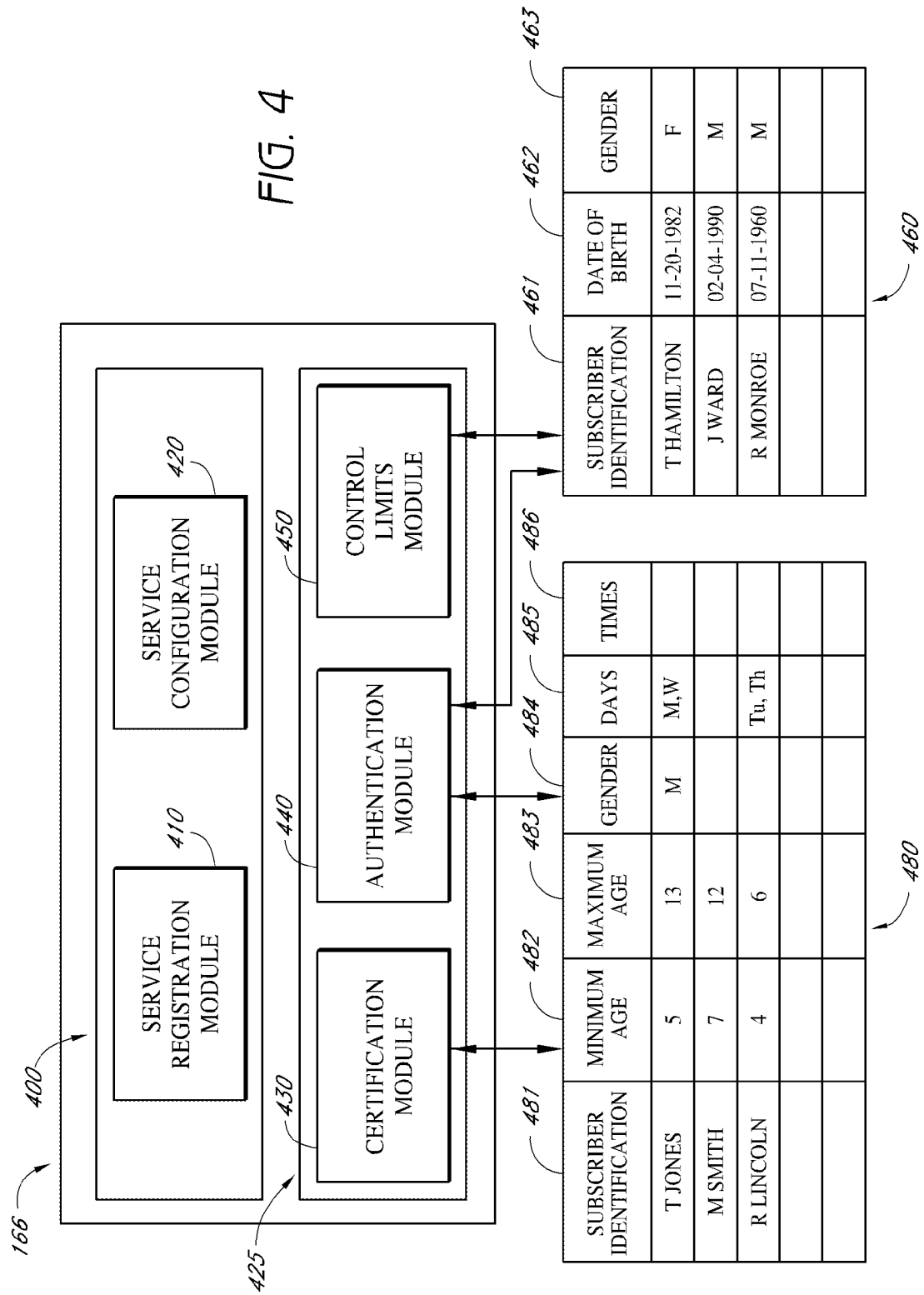
FIG. 4 illustrates a system configured to implement certified parental control for online communications, and illustrates exemplary certification server components.

FIG. 4 illustrates a system that implements certified parental control for online communications, and illustrates typical certification server components, in accordance with some embodiments of the inventions. In some embodiments, the certification server 166 can include a service module 400 and/or a subscriber module 425.

In an exemplary embodiment, the service module 400 can comprise a service registration module 410. The service registration module 410 can be configured to handle the registration process of an interactive application server 162 with the certification server 166 and/or allow access for the interactive application server 162 to the certification server 166. In some embodiments, if an interactive application server 162 is not registered with certification server 166, the interactive application server 162 can not access the certification server 166. In some embodiments, an interactive application server 162 can be registered if its IP address and/or domain name is known to the certification server 166.

The service registration module 410, in some embodiments, can include a list of registered interactive application servers and can grant access to interactive application servers based on their appearance on such a list. In some embodiments, the list can include IP addresses and/or domain names of authorized interactive application servers. Based on such a list, the service registration module 410 can exclude unauthorized interactive application servers, such that access to the certification server 166 can be denied to unregistered interactive application servers.

As further depicted in FIG. 4, the service module 400 can include a service configuration module 420. In some embodiments, the service configuration module 420 can allow an interactive application server 162 to be configured such that it can access the certification server 166. In some embodiments, once the interactive application server 162 has been registered by the service registration module 410, the service configuration module 420 can be used to provide an application programming interface to the interactive application server 162 such that the certification server 166 can be accessed.

As illustrated in FIG. 4, the subscriber module 425 can include a certification module 430. In some embodiments, the certification server 166 can be configured to execute the certification module 430, among others, in response to a request from the subscriber certification module 310 of the interactive application server 162 to register and/or certify a subscriber of the interactive application server 162. In some embodiments, the certification module 430 can communicate directly with the certification application module 220 to register and/or certify a subscriber.

In some embodiments, upon receiving a request from the subscriber certification module 310 and/or the certification application module 220, the certification module 430 can access a personal information database 460. In some embodiments, when a subscriber registers and/or certifies with the certification server 166, the personal information database 460 can be updated. The personal information database 460 can include a subscriber identification 461, subscriber date of birth 462, and/or subscriber gender 463. In some embodiments, the subscriber identification 460, can be an alphanumeric identifier uniquely associated with a subscriber.

In some embodiments, the personal information database 460 can contain a record uniquely associated with a subscriber identification 461. Each record can contain information including the subscriber's date of birth 462, gender 463, name, social security number, passport number, driver's license number, various government issued identification, address, telephone number, photograph, mother's maiden name, and/or other information. This information can be entered into personal information database 460 when a subscriber is registered and/or certified with the certification server 166 and/or at other times.

As further depicted in FIG. 4, the subscriber module 425 can include a control limits module 450. The control limits module 450 can be configured to communicate with the parental control module 240 of the computing system 100 through the parent configuration module 330 of the interactive application server 162 and/or directly over the network 160. In an exemplary embodiment, the parent can enter, update, and delete various control limits on subscribers of the application server 162 that their child can participate and/or engage in communications with using the parental control module 240. The parental control module 240 can then be configured to communicate with the parent configuration module 330 of interactive application server 162. The control limits module 450 can be configured to respond to a request from the parent configuration module 330, to enter control limits.

In some embodiments, the control limits module 450 accesses a control limits database 480 to track communication control limits placed on subscribers of an interactive application server 162. In some embodiments, when a parent enters, updates, or deletes control limits placed on who their child can engage in communications with, the certification server 166 can be configured to execute the control limits module 450 and the control limits database 480 can be adjusted accordingly. The control limits database 480 can include a subscriber identification 481 corresponding to a subscriber, such as a child. In some embodiments, the subscriber identification 460, can be an alphanumeric identifier uniquely associated with a subscriber.

In an exemplary embodiment, the control limits database 480 can contain a record uniquely associated with a subscriber identification 481. As illustrated in FIG. 4, each record in the control limits database can include limitations such as a minimum age 482, maximum age 483, and/or gender 484 on subscribers that a child can communicate with. Additionally, in some embodiments, each record in the control limits database 480 can include other information placing limitations on who a subscriber can engage in communications with. These control limits can include days 485 and/or times 486 limiting when a child can engage in communications while using the interactive application module 200.

In some embodiments, the subscriber module 425 of the certification server 166 can also include an authentication module 440. In some embodiments, the certification server 166 is configured to execute the authentication module 440, among others, in response to a request, such as a parental control request, over the network 160 from the subscriber authentication module 320 of the interactive application server 166 to authenticate, validate, and/or verify that a subscriber of the interactive application server 162 is within a set of associated categories that another subscriber, such as a child, can communicate with.

In some embodiments, the subscriber communication module 230 and/or the subscriber authentication module 320 can send the subscriber identification of two subscribers to the authentication module 440 to verify that they can communicate with one another. In an exemplary embodiment, a first subscriber of the interactive application server 162 can attempt to communicate with a second subscriber, such as a child. To verify that the first subscriber is within the set of associated categories that the child can communicate with, the authentication module 440 can be configured to have access to the personal information database 460 and/or the control limits database 480.

In some embodiments, the authentication module can use a language such as SQL to retrieve the record associated with the subscriber identification 461 of the first subscriber in the personal information database 460. The authentication module 440 can likewise retrieve the record associated with the subscriber identification 481 of the child in the control limits database 481. The authentication module 440 can then be configured to check whether the first subscriber is within the set of associated categories that the parent of the child has allowed the child to communicate with. When the authentication module 440 of the certification server 166 responds, communications between the child and subscriber can be enabled, blocked, and/or inhibited. In other embodiments, the computing system 100 can communicate with the authentication module 440 of the certification server directly 166.

III. OPERATION

Figure 5:
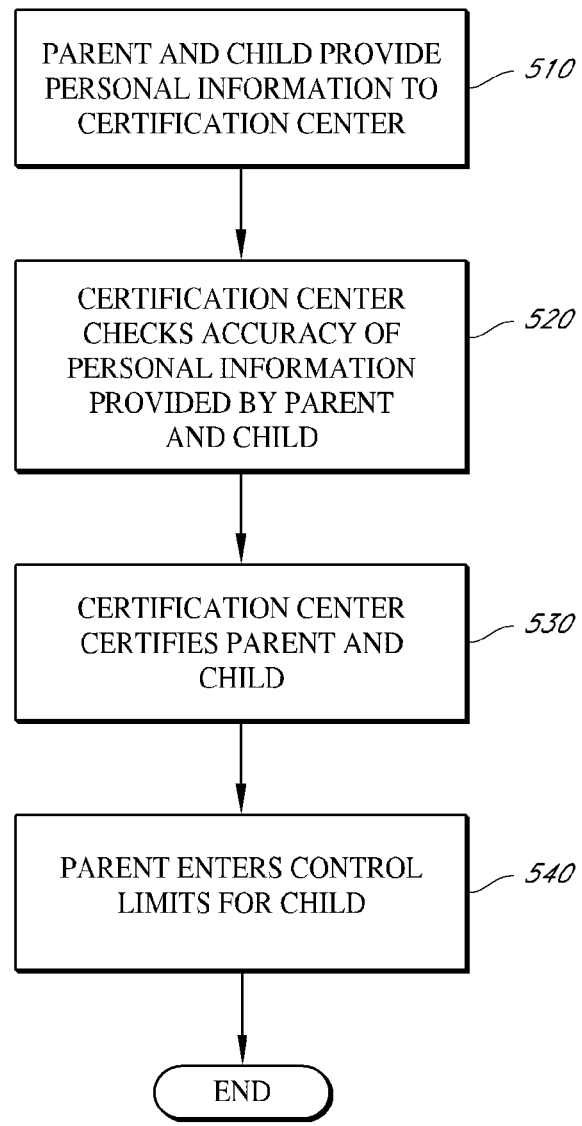
FIG. 5 is a flow chart illustrating embodiments of exemplary methods for providing certified parental control of online communication services, whereby a parent and child are registered and/or certified with a certification center.

FIG. 5 is a flow chart illustrating embodiments of methods for providing certified parental control of online communication services consistent with the present inventions whereby a parent and child are registered and/or certified with a certification center. In some embodiments, the online communication service can include the interactive application module 200, the interactive application service module 300, and/or the interactive application network module 305. In some embodiments, the online communication service can include the interactive application server 162. In some embodiments, the computing system 100, network 160, interactive application server 162, certification server 166, various databases, various components, various modules, and other systems described herein can be configured to execute this process. In some embodiments, the certification application module 220, the subscriber certification module 310, and/or the certification module 430 can be configured to execute this process. In exemplary embodiments, this process can be executed when any subscriber, including a child and/or a parent, registers and/or certifies themselves with a certification center.

In step 510, a parent and child provide personal information to a certification center. In some embodiments, the parent and/or child provide personal information. In some embodiments, personal information can be provided to the certification center using a computing system 100. In some embodiments, the certification server 166 can be configured as a certification center. In some embodiments, the personal information can be sent over a network 160 to the certification center 166 and/or to an interactive application server 162.

As described herein, the personal information can include a subscriber's name, social security number, driver's license number, passport number, various government identification, address, date of birth, gender, telephone number, photograph, mother's maiden name, and/or other identity verification information. In some embodiments, the personal information can be an identifier, such as a pin number and/or confirmation number associated with the subscriber.

In step 520, the certification center checks the accuracy of the personal information provided by the parent and child. In some embodiments, the certification center can run personal information, including identification numbers and/or other information, such as bar codes, associated with government issued documents through a computer system, private and/or public database, and/or perform a visual inspection on the personal information provided to ensure it is valid, authentic, and/or to confirm the identification of the parent and child. The government issued documents can be, in some embodiments, a passport, birth certificate, social security card, driver's license, and/or other documents. In some embodiments, the certification server can notarize a form issued by an online communication service, such as the interactive application server 162, which confirms the identity of the subscriber, including the parent and child, upon viewing valid identification.

In step 530, the certification center certifies the parent and child. In some embodiments, the subscriber can be certified when personal information, such as identity, age, and/or gender can be verified to ensure its accuracy by the certification server 166. In some embodiments, the certification center can assign an identifier that can be unique to a subscriber and/or associated with multiple subscribers to the parent and/or child when they are certified. In some embodiments, the identifier can be associated with an age group, gender, and/or other groups. In other embodiments, the certification center can notarize various documents to be presented to an online communication service provider.

In step 540, the parent enters various control limits on subscribers of online communication services that their child can engage in communications with. These control limits can include a minimum age, maximum age, gender, names, and other restrictions on subscribers that their child can communicate with. In some embodiments, the control limits can include limits on the level of subscriber memberships that their child can communicate with. It can be desirable to have three levels of subscribers—bronze, silver, and gold—with bronze being a subscriber who has confirmed the least amount of certification information such as identity, date of birth, gender, height and/or weight, a current photograph(s), and/or marital status. A silver subscriber can additionally require home ownership confirmation, income verification, and/or a credit report. A gold membership can additionally require the silver and gold information and, in addition, driving and criminal records, substance abuse testing, professional license association information, and/or other information. It should be noted that the level of subscribers are provided as an exemplary embodiment, and there can be as few as two or more than three.

Additionally, these control limits can include day and/or time limits when a child can engage in communications while using an online communication service. In exemplary embodiments, when a subscriber's personal information, the day, and/or the time does not satisfy the parental control limits in place, communications using the online communication service are not permitted. Alternatively, if the control limits are satisfied, communications using the online communication service are permitted. In some embodiments, the parental control module 240, parental monitor module 360, authentication module 440, control limits module 450, personal information database 460, and/or control limits database 480 can be configured to execute these steps.

FIG. 6 illustrates an example form page for allowing a parent to configure communication control limits for a child, and/or enable or disable the logging of online communications, in accordance with some embodiments of the inventions. In some embodiments, the computing system 100, network 160, interactive application server 162, certification server 166, various databases, various components, various modules, and other systems described herein can be configured to execute a process to generate the form page in a programming language such as HTML and/or JavaScript, and/or respond to the form page when saved 680 by using a programming language such as PHP. In exemplary embodiments, this page can be generated using a programming language such as HTML when a subscriber and/or the parent of a subscriber, such as a child, sets up control limits, and/or wishes to monitor and/or log communications between their child and other subscribers of the online communication service.

Advantageously, the form page can allow the parent of a child subscribing to the online communication service to enter a minimum age 610 and/or maximum age 620 of other subscribers of the online communication service that their child can engage in communications with. In some embodiments, the parent can also limit the gender 630 of other subscribers that their child can communicate with while using the online communication service. The form page can also allow a parent to place control limits on the level of subscriber memberships 640 of the online communication service that their child can contact. It can be desirable to have three levels of subscribers—bronze, silver, and gold—with bronze being a subscriber who has confirmed the least amount of certification information such as identity, date of birth, gender, height and/or weight, a current photograph(s), and/or marital status. A silver subscriber can additionally require home ownership confirmation, income verification, and/or a credit report. A gold membership can additionally require the silver and gold information and, in addition, driving and criminal records, substance abuse testing, professional license association information, and/or other information. It should be noted that the level of subscribers are provided as an exemplary embodiment, and there can be as few as two or more than three.

The form page can also include times 650 and/or days 660 when their child can be blocked from engaging in communications while using the online communication service provider.

In some embodiments, the form page can allow a parent to log communications 670 made by their child while using the online communication service. The parental control module 240 can be configured to handle online communication logging. In some embodiments, the logged communications can be stored on the computing system 100, the interactive application server 162, various databases including the interactive application communication log database 350, and/or the certification server 166. Advantageously, the parent can also configure the number of days to store the communication logs 670. In some embodiments, the parental control module 240, communication logging module 340, parental monitor module 360, and interactive application communication log database 350 can be configured to implement a process that generates the form page and/or responds to the form page by using a programming language, such as PHP, when the form is saved and/or cancelled 680.

Figure 7:
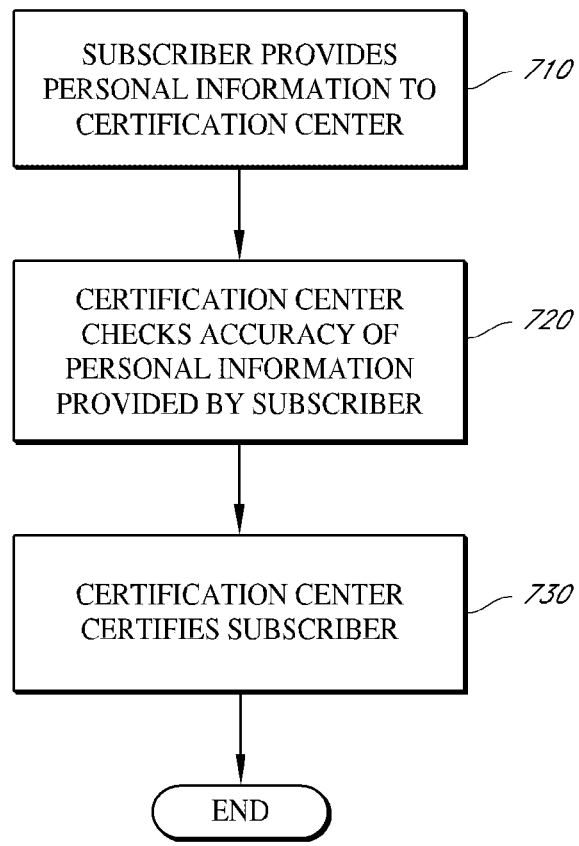
FIG. 7 is a flow chart illustrating embodiments of exemplary methods for providing certified parental control of online communication services, whereby a subscriber is registered and/or certified with a certification center.

FIG. 7 is a flow chart illustrating embodiments of methods for providing certified parental control of online communication services consistent with the present inventions, whereby a subscriber is registered and/or certified with a certification center. In some embodiments, the online communication service can include the interactive application module 200, the interactive application service module 300, and/or the interactive application network module 305. In some embodiments, the online communication service can include the interactive application server 162. In some embodiments, the computing system 100, network 160, interactive application server 162, certification server 166, various databases, various components, various modules, and other systems described herein can be configured to execute this process. In some embodiments, the certification application module 220, the subscriber certification module 310, the certification module 430, and/or the personal information database 460 can be configured to execute this process.

In step 710, the subscriber provides personal information to a certification center. In some embodiments, the subscriber can provide personal information to a certification center by using a computing system 100. In some embodiments, the certification server 166 can be configured as a certification center. In some embodiments, the personal information can be sent over a network 160 to the certification center 166 and/or to an interactive application server 162.

The personal information can include a subscriber's name, social security number, driver's license number, passport number, various government identification, address, date of birth, gender, telephone number, photograph, mother's maiden name, and/or other identity verification information. In some embodiments, the personal information can be an identifier, such as a pin number and/or confirmation number associated with the subscriber.

In step 720, the certification center checks the accuracy of the personal information provided by the subscriber. In some embodiments, the certification center can run identification numbers and/or other information, such as bar codes, associated with government issued documents through a computer system, private and/or public database, and/or perform a visual inspection on the personal information provided to ensure that the personal information is valid, authentic, and/or to confirm the identification of the parent and child. The government issued documents can be, in some embodiments, a passport, birth certificate, social security card, driver's license, and/or other documents. In some embodiments, the certification server 166 can notarize a form issued by an online communication service, such as the interactive application server 162, which confirms the identity of the subscriber.

In step 730, the certification center certifies the subscriber. In some embodiments, the subscriber can be certified when personal information, such as identity, age, and/or gender can be verified to ensure its accuracy by the certification server 166. In some embodiments, the certification center can assign an identifier that can be unique to a subscriber and/or associated with multiple subscribers when they are certified. In some embodiments, the identifier can be associated with an age group, gender, and/or other groups. In other embodiments, the certification center can notarize various documents to be presented to an online communication service provider.

Figure 8:
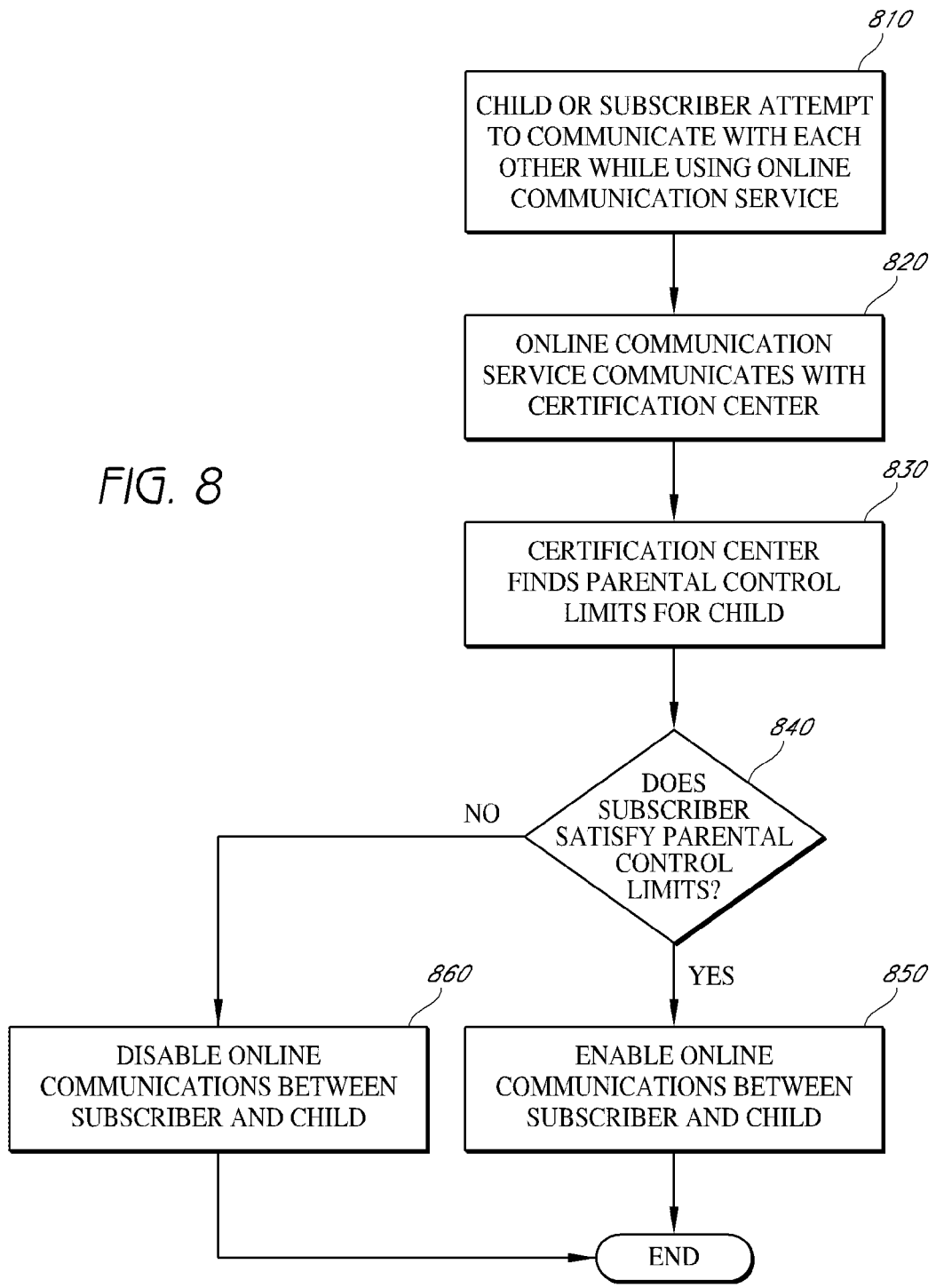
FIG. 8 illustrates a sequence of steps that can be performed when a child and another subscriber of an online communication service attempt to communicate with each other.

FIG. 8 illustrates a sequence of steps that can be performed when a child and another subscriber of an online communication service attempt to communicate with each other, in accordance with some embodiments of the inventions. In some embodiments, the online communication service can include the interactive application module 200, the interactive application service module 300, and/or the interactive application network module 305. In some embodiments, the online communication service can include the interactive application server 162. In some embodiments, the computing system 100, network 160, interactive application server 162, certification server 166, various databases, various components, various modules, and other systems described herein can be configured to execute this process. In exemplary embodiments, this process can be executed when any subscriber, including a child and/or a parent, attempts to communicate with another subscriber.

In step 810, a child and/or subscriber attempt to communicate with each other while using the online communication service. In some embodiments, this communication can be sent from a subscriber's computing system 100, over the network 160, and to the child's computing system 100 while using the interactive application module 200.

In step 820, the online communication service communicates with the certification center. In some embodiments, the interactive application server 162 can be configured as an online communication service and the certification server 166 can be configured as a certification center. The online communication service and the certification center can communicate over a network 160 using sockets and/or various networking protocols.

In step 830, the certification center finds the parental control limits for the child. The authentication module 440 and/or the personal information database 460 can be configured to perform this process. In step 840, a check is performed to determine whether the subscriber satisfies the parental control limits for the child. In some embodiments, the certification center, online communication service, and/or the computing system 100 of the subscriber and/or child can be configured to perform this check. In an exemplary embodiment, the authentication module 440 can also be configured to access the control limits database 480 to perform this step.

In step 850, online communication is enabled between the subscriber and the child, when the subscriber satisfies the parental control limits. The interactive application server 162, the computing system 100 of the subscriber and/or the child, and various modules can be configured to perform this step. In step 860, online communication is disabled between the subscriber and the child, when the subscriber does not satisfy the parental control limits. The interactive application server 162, the computing system 100 of the subscriber and/or the child, and various modules can be configured to perform this step.

FIG. 9 illustrates an example form page for allowing a parent to monitor online communications of a child, in accordance with some embodiments of the inventions. In some embodiments, the parent can monitor the communications of their child while using the interactive application module 200. In some embodiments, the logged communications can be stored on the computing system 100, the interactive application server 162, and/or the certification server 166. In some embodiments, the computing system 100, network 160, interactive application server 162, certification server 166, various databases, various components, parental control module 240 and/or other modules, and other systems described herein can be configured to execute a process to generate the form page in a programming language such as HTML and/or JavaScript, and/or respond to the form page when submitted using the OK button 960, by using a programming language such as PHP. In exemplary embodiments, this page can be generated using a programming language such as HTML when a subscriber and/or the parent of a subscriber, such as a child, sets up control limits and/or wishes to monitor communications between their child and other subscribers of the online communication service.

Advantageously, the form page can allow the parent of a child subscribing to the online communication service to track the time and/or date 910 of communications made by their child while using the online communication service. In some embodiments, the parent can also determine the length 920 of communications their child had with another subscriber. In some embodiments, the parent can determine who 930 their child has communicated with while using the online communication service, which can be the name of the subscriber, subscriber identification, and/or other identification. The form page can also allow a parent to determine the status 940 of logged communications, so they can be notified of potential problems in the logged communications. In some embodiments, the logged communications, including text, voice, video, images, documents, and/or other communications can be searched for profanity, sexual content, and using other criteria to determine whether they are suspicious. The form page can also allow the parent to save, print, save, e-mail, view, and delete 950 the various logged communications of their child.

IV. CONCLUSION

All of the methods and processes described above can be embodied in, and fully automated via, software code modules executed by one or more general purpose computers. The code modules can be stored in any type of computer-readable medium or other computer storage device. Some or all of the methods can alternatively be embodied in specialized computer hardware.

Although this invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the following claims.

What is claimed is:

1. A system for providing certified parental control of online social networks and video games, the system comprising:
  a database comprising at least one entry associated with a set of control limits for a child, said set of control limits including a plurality of personal characteristics of persons defining categories of persons said child may communicate with;
  an online communication server comprising hardware and software and including an interactive application module configured to allow first and second users to interact and communicate in an online environment;
  a certification server configured to communicate with the online communication server over a network to provide access to said database, the certification server comprising a server application that (a) registers and certifies a parent, (b) registers and certifies a child, and (c) receives and stores control limits for the child in said database;
  wherein the certification server is configured to respond to a parental control request from said online communication server that matches an entry for the child in the database by checking whether a subscriber has sufficient personal characteristics to fall within any one of said categories of persons said child may communicate with; and wherein
  said online communication server is configured to filter, enable, or disable a subscriber communication from said subscriber to said child depending on the response from the certification server;
  wherein said control limits comprises a minimum age and a maximum age, wherein said control limits further comprises a gender.

2. The system of claim 1, wherein said online communication server comprises a multiplayer gaming server.

3. The system of claim 1, wherein said online communication server comprises a social network server.

4. The system of claim 1, wherein said control limits further comprises times when communication is not enabled.

5. The system of claim 1, wherein said certification server further comprises a monitoring application that logs communications from said subscriber to said child.

6. The system of claim 5, wherein said monitoring application notifies said parent of potential problems in said logged communications.

7. A computer-implemented method of providing certified parental control for online social networks and video games, the method comprising:
- registering and certifying with a hardware server having a processor, a parent;
- registering and certifying a child;
- registering and certifying a third person;
- receiving and storing in a database a set of control limits from said parent, said set of control limits including at least two personal characteristics of persons defining categories of persons said child may communicate with, wherein said at least two personal characteristics comprises a minimum age and a maximum age, and a gender;
- receiving a third party communication over a network from the third person interacting with said child over an online interactive server, the third party communication being from the third person directed to said child;
- checking whether said third person has sufficient personal characteristics to fall within any one of said associated categories of persons said child may communicate with; and
- filtering, enabling, or blocking said third party communication from said third person, in response to said checking.

8. The method of claim 7, wherein said network comprises a multiplayer video gaming network.

9. The method of claim 7, wherein said network comprises an online social network.

10. The method of claim 7, wherein said control limits further comprises days when communication is not enabled.

11. The method of claim 7, further comprising monitoring communications from said third person to said child such that communications are logged.

12. The method of claim 11, wherein said monitoring notifies said parent of potential problems in said logged communications.

13. A computer-implemented method of providing certified parental control of an interactive application, the method comprising:
- receiving and storing in a database, with a hardware server having a processor, a set of control limits from a parent, said set of control limits including at least two personal characteristics of persons defining categories of persons a child may communicate with, wherein receiving and storing comprises receiving from the parent an age and storing the age in the database, receiving from the parent a gender and storing the gender in the database;
- receiving a communication to said child using the interactive application from a third person who is interacting with said child in the interactive application; and
- automatically checking in said database, in response to receiving said communication, whether said third person has sufficient personal characteristics to fall within the categories of persons said child may communicate with, wherein said checking comprises comparing an age of the third person to the age from the parent stored in the database and comparing a gender of the third person with the gender from the parent stored in the database; and
- wherein the checking inhibits unauthorized communications to said child from the third person.

* * * * *